United States Patent
He et al.

(10) Patent No.: US 8,594,193 B2
(45) Date of Patent: Nov. 26, 2013

(54) METHOD AND DEVICE FOR MULTI-VIEW ENCODING/DECODING USING DISPARITY VECTOR

(75) Inventors: Yun He, Shenzhen (CN); Xiaozhong Xu, Shenzhen (CN); Gang Zhu, Shenzhen (CN); Ping Yang, Shenzhen (CN); Jianhua Zheng, Shenzhen (CN); Shujuan Shi, Shenzhen (CN); Xiaozhen Zheng, Shenzhen (CN); Xinjian Meng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1100 days.

(21) Appl. No.: 12/239,226

(22) Filed: Sep. 26, 2008

(65) Prior Publication Data
US 2009/0022222 A1    Jan. 22, 2009

Related U.S. Application Data (63) Continuation of application No. PCT/CN2007/001030, filed on Mar. 29, 2007.

(30) Foreign Application Priority Data

Mar. 29, 2006 (CN) .......................... 2006 1 0070971
Jul. 11, 2006 (CN) .......................... 2006 1 0100877

(51) Int. Cl.
*H04N 7/12* (2006.01)
*H04N 11/02* (2006.01)
*H04N 11/04* (2006.01)

(52) U.S. Cl.
USPC ............ 375/240.12; 375/240.01; 375/240.16; 348/394.1; 348/407.1; 348/412.1; 348/415.1; 348/413.1; 382/283

(58) Field of Classification Search
USPC .......................... 375/240.01–240.29; 348/48, 348/385.1–440.1; 382/233–253
See application file for complete search history.

(56) References Cited

U.S. PATENT DOCUMENTS 6,055,012 A * 4/2000 Haskell et al. .................. 348/48
6,055,274 A    4/2000 McVeigh
(Continued)

FOREIGN PATENT DOCUMENTS

CN    1450816 A    10/2003
CN    1638491 A    7/2005
(Continued)

OTHER PUBLICATIONS

Written Opinion of the International Searching Authority in corresponding PCT Application No. PCT/CN2007/001030 (Jul. 5, 2007).

(Continued)

*Primary Examiner* — Sath V Perungavoor
*Assistant Examiner* — Nathnael Aynalem
(74) *Attorney, Agent, or Firm* — Leydig, Voit & Mayer, Ltd.

(57) ABSTRACT

A method of obtaining a disparity vector and its encoding/decoding in the multi-view coding process is disclosed. The present invention includes essentially: determining a disparity vector between two views during the multi-view image coding, and computing a disparity vector between the other two views according to the disparity vector between the two views and the known relative location information between each of the views. Thereafter, the disparity vector is used for multi-view encoding/decoding. The present invention further makes use of the correlation between the disparity vector and depth information of the spatial vector on one hand, and on the other hand makes use of the direct relationship between the disparity vector and the location of each of the cameras. It is experimentally proved that the disparity vector between several views can be accurately computed during the multi-view coding, thereby improving the performance of multi-view coding.

8 Claims, 4 Drawing Sheets

(56) References Cited

U.S. PATENT DOCUMENTS

2003/0038875 A1     2/2003  Ivanov et al.
2003/0202592 A1*  10/2003  Sohn et al. ............... 375/240.16
2005/0105610 A1     5/2005  Sung
2005/0129325 A1     6/2005  Wu
2006/0222252 A1*  10/2006  Lee ............................ 382/239

FOREIGN PATENT DOCUMENTS

| CN | 1678084 A | 10/2005 | |
| EP | 1835747 A1 * | 9/2007 | ............... H04N 7/12 |
| JP | 9275578 | 10/1997 | |
| JP | 2003304562 A | 10/2003 | |

OTHER PUBLICATIONS $1^{st}$ Office Action in corresponding Chinese Application No. 200610070971.9 (Jul. 17, 2009).
$2^{nd}$ Office Action in corresponding Chinese Application No. 200610070971.9 (Aug. 4, 2010).
$3^{rd}$ Office Action in corresponding Chinese Application No. 200610070971.9 (Apr. 8, 2011).
Mei et al., "Multi-view Disparity Estimation Algorithm based on Disparity Interpolation and Similarity," Jul. 1, 2009, China Academic Journal Electronic Publishing House, China.
International Search Report in corresponding PCT Application No. PCT/CN2007/001030 (Jul. 5, 2007).
Rejection Decision in corresponding Chinese Application No. 2006100709719 (Sep. 26, 2011).
Sullivan et al., "Text of ISO/IEC 14496-10:200X $5^{th}$ Edition," Oct. 2008, JVT, ITU-T, Geneva, Switzerland.
Zhu et al., "Inter-view Direct Mode in MVC," Apr. 2006, Tsinghua University, Haidian, Beijing, China.
Notification of Reexamination in corresponding Chinese Patent Application No. 200610070971.9 (Jul. 2, 2013).

* cited by examiner

METHOD AND DEVICE FOR MULTI-VIEW ENCODING/DECODING USING DISPARITY VECTOR

CROSS-REFERENCE TO RELATED APPLICATION

This application is a continuation of International Patent Application No. PCT/CN2007/001030, filed Mar. 29, 2007, which claims priority to Chinese Patent Application No. 200610070971.9, filed Mar. 29, 2006, and Chinese Patent Application No. 200610100877.3, filed Jul. 11, 2006, each of which is hereby incorporated by reference in its entirety.

FIELD OF THE INVENTION

The present invention relates generally to an image coding technology in the field of multimedia, and in particular, to a multi-view encoding/decoding technology.

BACKGROUND OF THE INVENTION

In the field of multi-view image coding technology, it is expected that images can be encoded by effectively using the correlation between different view images. For this purpose, a disparity concept is proposed, which is defined as an offset between two projection points of one same spatial point on different image planes.

A disparity estimation operation is needed for acquiring accurate disparity. The disparity estimation is a procedure for finding a disparity vector of a pixel or block in a reference frame which corresponds to a current frame, under a given rule. The disparity vector is the disparity value to be determined.

Currently, disparity vectors between different views are closely related to location parameters of cameras between different views. The estimation operation on the disparity vector can be performed more accurately by effectively using location information of each view camera, thereby improving the encoding/decoding efficiency.

However, nowadays there is no technology for accurately acquiring the disparity vector at a decoding end so as to perform decoding and improve encoding/decoding efficiency.

SUMMARY OF THE INVENTION

Embodiments of the present invention provide a method and a device for acquiring a disparity vector and performing multi-view encoding/decoding, which effectively improves the efficiency of the multi-view encoding/decoding.

An embodiment of the present invention provides a multi-view encoding method, including:

encoding views according to disparity vectors between the views;

acquiring location parameter information for cameras corresponding to the views, which represent locations of the cameras;

encoding the location parameter information; and writing the encoded location parameter information to a bitstream.

An embodiment of the present invention provides a multi-view decoding method, including:

receiving a bitstream;

obtaining location parameter information for cameras in the bitstream;

determining disparity vectors between views according to the location parameter information; and decoding the views by using the disparity vectors.

An embodiment of the present invention provides a multi-view encoding device arranged at an encoding end, including:

a camera parameter acquisition unit, configured to acquire location parameter information for cameras corresponding to views, which represent locations of the cameras;

a camera parameter encoding unit, configured to encode the location parameter information and writing the encoded the location parameter information to a bitstream; and an encoding operation unit, configured to encode the coding views according to the location parameter information acquired by the camera parameter acquisition unit, and outputting the encoded bitstream.

An embodiment of the present invention provides a multi-view decoding device arranged at a decoding end, including:

a camera parameter decoding unit, configured to receive and decode a bitstream transmitted from an encoding end, and acquire location parameter information for cameras in the bitstream;

a disparity vector determination unit, configured to calculate and determine disparity vectors between views, according to the location parameter information for cameras which is decoded and acquired by the camera parameter decoding unit; and a decoding operation unit, configured to decode the received bitstream, according to the disparity vector determined by the disparity vector determination unit.

An embodiment of the present invention provides a method for acquiring a disparity vector in a process of encoding multi-view, wherein the method is used for processing at least three multi-view images, comprising the steps of:

determining a first disparity vector between any two views in the process of encoding the multi-view images, or determining depth information of a spatial object; and computing and acquiring a second disparity vector between two views needed for encoding, according to the first disparity vector or the depth information of the spatial object and information about relative locations between the views.

An embodiment of the present invention provides a device for acquiring a disparity vector in a process of encoding multi-views, including:

an information acquisition unit, configured to determine a first disparity vector between any two views in a process of encoding multi-view images, or determine depth information of a spatial object; and a disparity vector determination unit, configured to compute and acquire a second disparity vector between two views needed for the encoding, according to the first disparity vector or the depth information of the spatial object obtained by the information acquisition unit, and information about relative locations between the views.

In the embodiments of the present invention, the location relationship between different cameras is taken into consideration, and the disparity vector used in the encoding process is determined according to the location relationship, so that the estimation of disparity vectors between different views is more accurate.

In the embodiments of the present invention, the location information for cameras corresponding to the multi-views is encoded and transmitted to the decoding end, so that the relationship of relative locations between cameras (i.e. the location parameter information for cameras) can be used at the decoding end to determine the disparity vectors between different views which are used in the encoding for the decoding process, thereby to improve the performance of the multi-view encoding and simplify the multi-view processing.

DETAILED DESCRIPTION OF THE EMBODIMENTS

In multi-view coding, the location relationship between the cameras (i.e., location parameter information for cameras) is closely related to the disparity vector between the views. Therefore, an embodiment of the present invention provides a implementation solution in multi-view coding that acquires the information about relative locations between the views at a decoding end, i.e., acquires the location parameter information for the corresponding camera, so that the disparities vector between the views can be accurately computed at the decoding end by using the location parameter information for cameras, to improve the coding efficiency.

Figure 1:
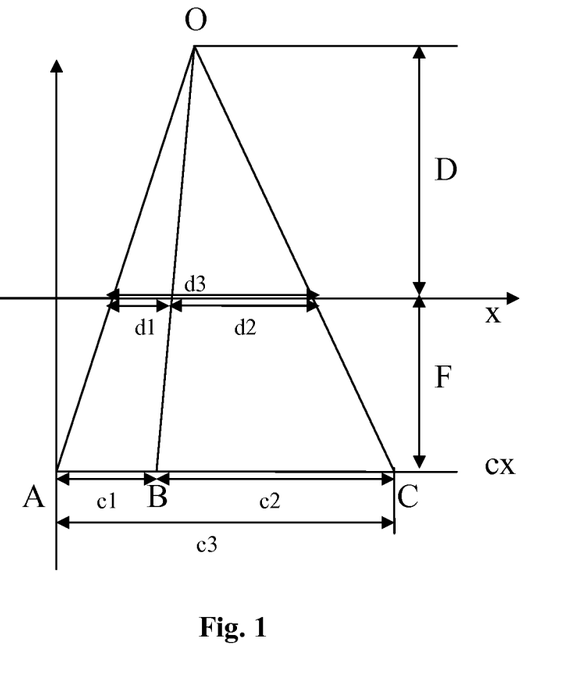
FIG. 1 shows the relationship between disparity vectors as well as depth information of an object and camera locations.

As shown in FIG. 1, where A, B, C indicate locations of any three cameras in the multi-views (may also be referred to as three views); c1, c2 and c3 are the distances between each two among the three cameras, respectively; O indicates a same spatial object shot by the three cameras; X axis is an imaging plane; d1, d2 and d3 indicate the disparity vectors between each two among the views A, B, and C of the object O, respectively.

It can be easily seen from FIG. 1 that the distances between each two among the three cameras are proportional to the corresponding disparity vector between two respective views with respect to the object O. Though the proportional relationship is simple, it can be seen from the relationship that there is a fixed computational relationship between the disparity vectors between the views having determined locations, for example $$\frac{d1}{c1} = \frac{d2}{c2} = \frac{d3}{c3} = \frac{D}{D+F}.$$

Obviously, other existing mathematical computational relationships between the views shown in FIG. 1 can be used to determine the disparity vectors between the views, according to the location parameter information for cameras. Thus, according to the disparity vector between two views determined by this computation and the information about relative locations between the views, the disparity vectors between any other two views can be determined, so as to simplify the acquisition process of the disparity vectors.

The association between the relationship between the disparity vectors and the relative location relationship between the cameras makes it necessary to transmit the location parameter for the cameras during the encoding process. For example, c1, c2 and c3 shown in FIG. 1 can be transmitted to the decoding end, as the location parameter information for cameras.

Detailed implementations at the encoding end and decoding end in a specific implementation according to an embodiment of the present invention are described below.

(I) First, detailed description about the improvement on the encoding end according to an embodiment of the present invention is given below.

At the encoding end, the location parameter for cameras representing location information of cameras corresponding to a plurality of views is acquired. The location parameter information for cameras is then encoded and written to a bitstream.

In the embodiments of the present invention, specific flag information may be written to the bitstream of multi-view encoding, to indicate that the relative location information has been written to the bitstream. That is, by writing the specific flag information to the bitstream, it can be identified whether the location parameter for each camera corresponding to each view, including a coding view and a reference view, has been written to the bitstream, so that the decoding end can identify whether the bitstream contains the location parameter information for cameras, and the location parameter information can be decoded and obtained. Here, the encoding view refers to a view to be encoded currently, and the reference view refers to a view to be referenced currently in the process of encoding the current view.

The flag information may be written to a specific location in the bitstream while encoding. For example, it can be written after a start code, or other specific locations, so that the flag information can be obtained from the corresponding location at the decoding end.

The flag information may be one bit of data for indicating whether the bitstream contains the location parameter information for camera, or flags of various forms including the same information.

It should be noted that if there exists, in the bitstream, the flag information indicating whether the location parameter information for camera is written to the bitstream, then, after writing the corresponding flag, the location parameter information for camera is written to the specific location in the bitstream. The specific location in the bitstream may be before a first encoding image in the bitstream or at any location in the encoded bitstream, as long as the decoding can be finished before the decoder is to make use of the camera parameter.

At the encoding end, the encoding bitstream contains relevant information on the encoded images of views. The location parameter information for the camera corresponding to a current view can be written in locations before the bitstream locations corresponding to the content of views, respectively, such as in an image header of the first encoding image of each view.

In an embodiment of the present invention, the location parameter information for camera includes the absolute location information for camera and the relative location information for the camera. That is to say, an entropy encoding method (such as with a unary code) can be performed on the absolute coordinate for the cameras corresponding to the views, as the location information for the camera, and the encoded result is written to the bitstream. Or else, the location of one of the cameras is taken as the origin of the coordinate system, and an entropy encoding (such as with a unary coding) can be performed on the relative coordinates of the neighboring cameras, as the location parameter information for the camera, and the encoded result is written to the bitstream. The location parameter information for camera may also include information on motion of the cameras, such as the rotation between cameras, the movement of the cameras, and etc. The encoding method for the information on motion of the camera is similar to that for the information on the absolute location or relative location of the camera.

The location parameter information for the camera written to the bitstream is transmitted to the decoding end together with the bitstream.

Figure 2A:
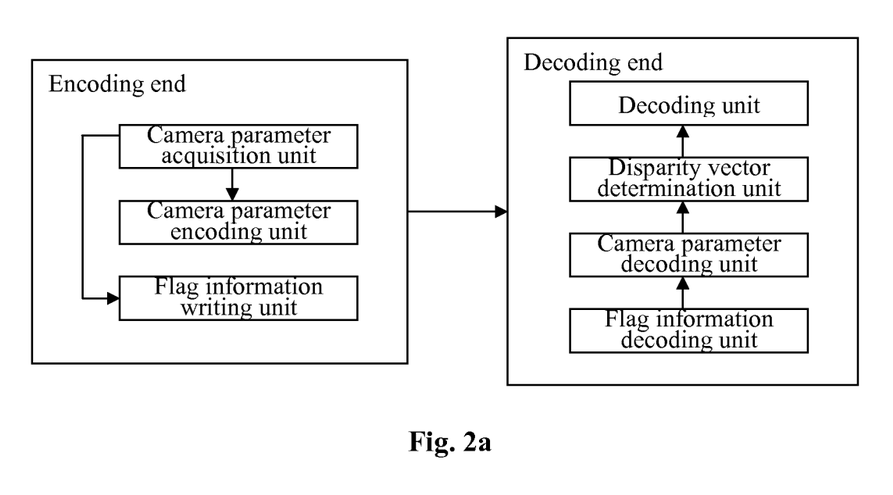
FIG. 2a is a first schematic diagram of an implementation structure of an encoding/decoding device, according to an embodiment of the present invention.
Figure 2B:
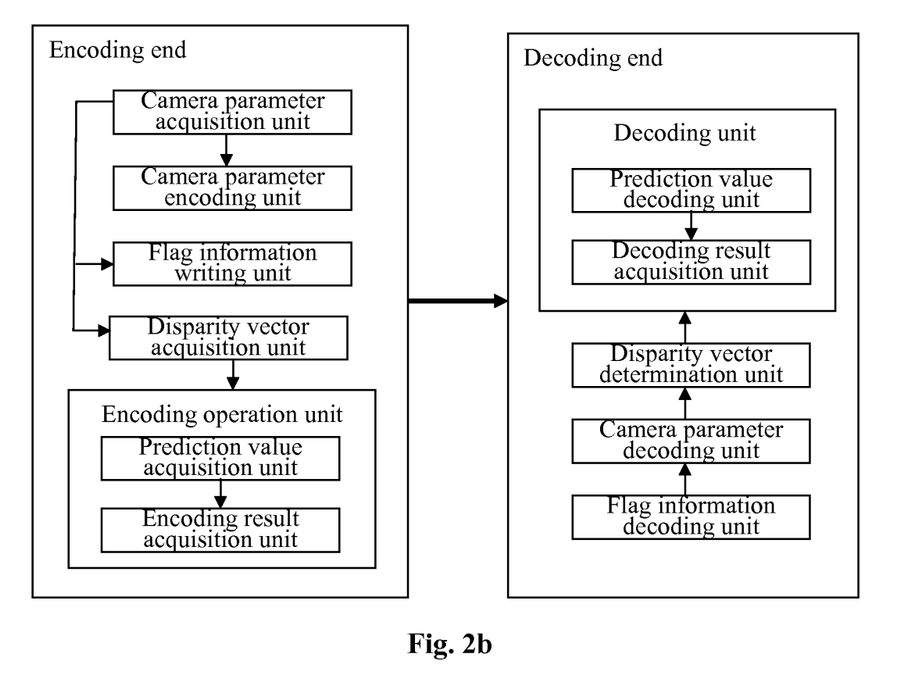
FIG. 2b is a second schematic diagram of an implementation structure of an encoding/decoding device, according to an embodiment of the present invention.

Based on the above multi-view encoding scheme, an embodiment of the present invention also provides a multi-view encoding device which is arranged at the encoding end. The detailed structure of the device is shown in FIGS. 2a and 2b, which includes the following units:

a camera parameter acquisition unit, configured to acquire the location parameter information for cameras corresponding to the views, the information represents locations of the cameras;

a camera parameter encoding unit, configured to encode the location parameter information for cameras and have it written to the bitstream. The camera parameter encoding unit includes two encoding units:

a first encoding unit, configured to take the absolute coordinates of the cameras as their respective location parameter information for the cameras, perform the entropy encoding on the location parameter information and have it written to the bitstream; and a second encoding unit, configured to take the location of an arbitrary camera as the coordinate origin, determine the relative coordinates of neighboring cameras, as their location parameter information for cameras, perform the entropy encoding on the location parameter information and have it written to the bitstream.

The device according to the present embodiment may also include a flag information writing unit, configured to write a flag information indicating whether the location parameter information for cameras corresponding to views, including a encoding view and a reference view, has been written to the bitstream; by means of the flag information is written by the flag information writing unit, the decoding end can determine whether the location parameter information for the cameras is included in the bitstream, so as to perform fast decoding; and an encoding operation unit, configured to encode the coding view according to the location parameter information for cameras which is acquired by the camera parameter acquisition unit, and output the encoded bitstream.

According to an embodiment of the present invention, the device as shown in FIG. 2b further includes:

a disparity vector acquisition unit, configured to determine a first disparity vector between any two views during the encoding of the multi-view image, and compute a second disparity vector between two views needed for the encoding according to the first disparity vector and the information about relative locations of the views.

Here, the encoding operation unit is configured to encode the coding view according to the second disparity vector determined by the disparity vector acquisition unit, and output the encoded result;

wherein, the location parameter information acquired by the camera parameter acquisition unit is the first disparity vector and the information about relative locations between the views; or the first disparity vector and the second disparity vector.

Furthermore, the encoding operation unit may include:

a prediction value acquisition unit, configured to acquire a prediction value for the encoding view by weighting and summing up a corresponding pixel in the reference view to which the disparity vector between the encoding view and one reference view points and a corresponding pixel in the reference view to which the disparity vector between the encoding view and another reference view points; and an encoded result acquisition unit, configured to subtract the prediction value from an original value for the encoding view to obtain the residual value for the encoding view, and encode the residual value to acquire the encoded result of the encoding view.

(II) Next, detailed description about the improvement on the decoding end according to an embodiment of the present invention is given below.

The decoding end receives and decodes the bitstream transmitted from the encoding end to acquire the location parameter information for the corresponding camera.

Since the information about relative locations between the views is already written to the bitstream at the encoding end, thus the corresponding information can be decoded and obtained at the decoding end. That is, if the flag information representing the location parameter for camera existed in the bitstream is decoded and obtained, the location parameter information for camera can be obtained through decoding from the specific location in the bitstream. Thus, the disparity vector needed during the decoding process can be computed and determined, according to the location parameter information for camera as the information about relative locations between the views. For example, the disparity vector is computed and determined by use of, but being not limited to, the computational relationship between the views, i.e., $$\frac{d1}{c1} = \frac{d2}{c2} = \frac{d3}{c3} = \frac{D}{D+F}.$$

An embodiment of the present invention also provides a multi-view decoding device which is arranged at the decoding end. The detailed structure of the device is shown in FIGS. 2a and 2b, including:

a camera parameter decoding unit, configured to decode the received bitstream transmitted from the encoding end and acquire the location parameter information for camera in the bitstream.

Furthermore, since it is possible to write the flag information to the bitstream at the encoding end, the multi-view decoding device further includes a flag information decoding unit.

The flag information decoding unit is configured to decode, from the bitstream, the flag information indicating whether information about the relative locations between the views, including a coding view and a reference view, exists in the bitstream, and actuate the camera parameter decoding unit after acquiring the flag information.

At the decoding end, a main purpose for acquiring the location parameter information for camera is to determine the corresponding disparity vector, which is in turn used for decoding operation. Therefore, the multi-view decoding device according to the embodiments of the present invention further includes the following two processing units:

a disparity vector determination unit, configured to compute and determine the disparity vectors between the views, according to the decoded location parameter information for cameras, and transmit it to a decoding unit; and a decoding unit, configured to subsequently decode the received bitstream, according to the disparity vector.

In this embodiment, the location parameter information for camera obtained by the camera parameter decoding unit may be a first disparity vector and an information about the relative locations between the views, or a first disparity vector and a second disparity vector; wherein:

the first disparity vector is a disparity vector between the coding view and one reference view, and the second disparity vector is a disparity vector between the coding view and another reference view;

or, the first disparity vector is a disparity vector between two reference views, and the second disparity vector includes a fourth disparity vector and a fifth disparity vector, wherein the fourth disparity vector is a disparity vector between the coding view and one reference view, and the fifth disparity vector is a disparity vector between the coding view and another reference view.

Moreover, the decoding unit according to the embodiment of the present invention as shown in FIG. 2b may further include:

a prediction value decoding unit, configured to acquire a prediction value for the coding view, by weighting and summing up a corresponding pixel in the reference view to which the disparity vector between the coding view and one reference view points and a corresponding pixel in the reference view to which the disparity vector between the coding view and another reference view points; and a decoding result acquisition unit, configured to add the prediction value for the coding view to the residual value for the coding view to acquire a reconstructed value for the coding view.

It is appreciated from the above implementation solution provided by the embodiments of the present invention that, the key of the implementation of the embodiment is to encode the location parameter information for camera and have the information written to the bitstream. A detailed description of the above procedure is given below to make the embodiment of the present invention more apparent.

Figure 3:
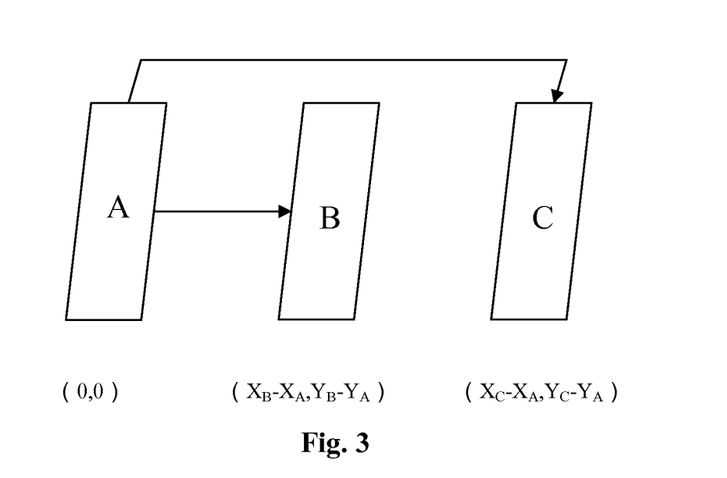
FIG. 3 is a first relationship diagram between a coding view and a reference view.
Figure 4:
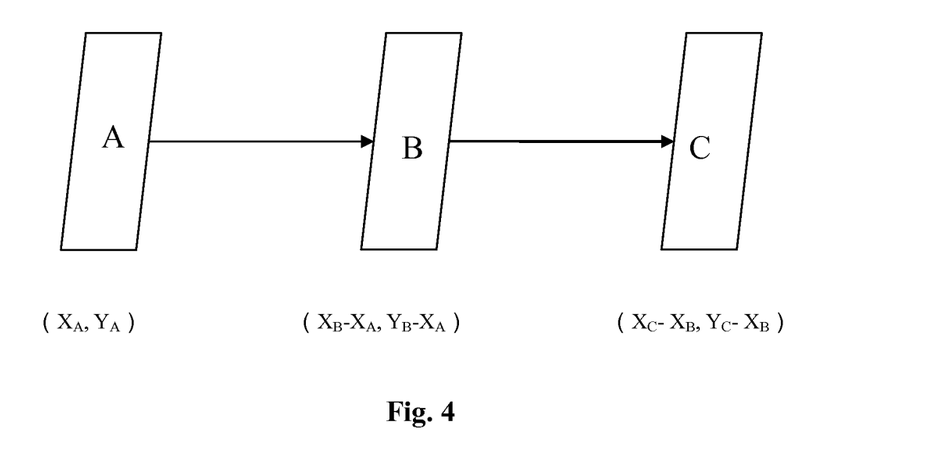
FIG. 4 is a second relationship diagram between a coding view and a reference view.

An embodiment of the present invention shows a simple example in which the cameras for the views in the multi-view encoding are arranged on the same plane with no rotation between the cameras, as illustrated in FIGS. 3 and 4. In the figures, A, B, C are arbitrary three cameras (also referred to as three views) in a multi-view, and the coordinates for the corresponding cameras are, respectively:

A: $(X_A, Y_A)$, B: $(X_B, Y_B)$ and C: $(X_C, Y_C)$.

The location parameter information for the cameras A, B and C are encoded and written to the bitstream, for example, by the following two schemes.

(1) The camera parameters are separately encoded at each view.

Specifically, the absolute coordinates of each camera are encoded, or the location coordinates of a specific view are subtracted from all the location coordinates uniformly (relative coordinates), that is, an information about relative locations of the cameras is taken as the location parameter information for cameras.

FIG. 3 shows an example in which the relative location information for cameras is taken as the location parameter information for cameras, and the encoding process includes specifically: the location coordinates (XA, YA) (or (0, 0)) for camera A is written to the image header of a first encoding image of the view corresponding to camera A; the location coordinates (XB, YB) (or (XB−XA, YB−YA)) for camera B is written to the image header of a first encoding image of the view corresponding to camera B; the location coordinates (XC, YC) (or ((XC−XA, YC−YA))) for camera C is written to the image header of a first encoding image of the view corresponding to camera C.

(2) The location parameters for all the cameras are collected for being encoded.

Similarly, according to this encoding manner, the absolute coordinates of the cameras are encoded, or the location coordinates of a specific view are subtracted from all the location coordinates uniformly (relative coordinates), that is, the information about relative locations of the cameras is taken as the location parameter information for cameras.

FIG. 4 shows another example in which the information about the relative locations of cameras as the location parameter information for cameras, and the encoding of the relative location coordinates of the neighboring cameras includes: writing the location coordinates (XA, YA) for camera A; writing the location coordinates (XB−XA, YB−YA) for camera B; and writing the location coordinates (XC−XB, YC−YB) for camera C.

According to the embodiments of the present invention, the location parameter information for cameras can be effectively encoded and transmitted, thereby improving the performance of multi-view encoding and simplifying the processing of multi-view encoding.

An embodiment of the present invention further provides a method for acquiring the disparity vector in encoding process. Specifically, information about locations between the cameras can be used to accurately compute the disparity vectors between the views.

When locations of the cameras are fixed, the disparity vector depends only on depth information of the spatial object (the distance between the spatial object and the camera) and the location relationship between the cameras. Thus, the embodiments of the present invention make effectually use of the information about locations between various cameras to accurately compute the disparity vector, which makes the disparity vector become a preferable encoding parameter in multi-view encoding process.

For example, as shown in FIG. 1, in an embodiment of the present invention, the location relationship between the cameras can be used, when one of the disparity vectors di (i=1, 2, 3) is known, the other two disparity vectors can be computed by use of the proportional relationship.

According to the analysis on FIG. 1, it can be appreciated that the proportional relationship between the disparity vectors and the camera locations is also applicable to the case of the cameras not being arranged on one line. In this case, x and cx represent a plane; d1, d2 and d3 represent the absolute values of the disparity vectors; c1, c2 and c3 represent the absolute distances between the cameras, and the direction of each disparity vector is the same as the orientation of the camera. Here, there is still a fixed computational relationship between d1, d2, d3 and c1, c2, c3. Moreover, the above just explains the fixed computational relationship with reference to an example of three cameras. For more than three cameras, a corresponding fixed computational relationship still holds true.

In actual application of the embodiments of the present invention, the plurality of view may be arranged regularly or irregularly, that is, the embodiments of the present invention may be suitable for the applications of regularly or irregularly arranged multi-views. In the regular arranged schemes, the arrangements of a line, a cross or a square are recommended, though other arrangements may be used as well.

Based on the above analysis, the implementation method of the embodiments of the present invention is described below.

According to the method for acquiring disparity vector in multi-view encoding process according to the embodiments of the present invention, after determining a disparity vector between two first views in the multi-view image encoding process, a disparity vector between two second views is computed according to the disparity vector between the two first views and the information about relative locations between the known views. Moreover, the embodiments may be applicable to regularly-arranged or irregularly-arranged multi-views.

Taking the case of the multi-view being three views as an example, the three views include one coding view which is to be encoded and two reference views. First, the disparity vector between any two among the three views is determined; it may be the disparity vector between the coding view and any of the reference views or between the two reference views. After that, the disparity vector between the coding view and the other reference view is computed, according to the determined disparity vector between any two views and the relative location between the three views.

Alternatively, in the above processing procedure, the estimation of the disparity vectors between the views can be computed by using the known disparity vector between the two views and the relative location between the views, and the location to which the acquired estimation points is taken as a start point, to determine the corresponding disparity vector.

The above implementation will be described with reference to the following example.

(1). At the encoding end, the disparity vector between two views during the multi-view image encoding is first determined, and the disparity vector between the encoding view and the reference view is computed according to the disparity vector between the two views and the known information about relative locations between the views. Next, the location of a reference view, to which the acquired disparity vector points, is taken as a start location (i.e., as a reference location), and a disparity estimation is performed in a defined way on the reference view within a specific range. For example, the disparity vector estimation acquired according to the embodiments of the present invention is taken as a center of a search window, and a search similar to motion estimation is performed in a search window having a predefined size, so as to obtain a disparity vector with a smaller matching error. A more accurate disparity vector is determined as the disparity vector between the determined encoding view and the reference view, which is used to encode the encoding view, and the encoded result and the encoded disparity vector between the determined encoding view and the reference view are written to the bitstream.

(2). At the decoding end, the bitstream is received and parsed to obtain the disparity vector between the determined encoding view and the reference view. The bitstream is decoded by using the disparity vector between the determined encoding view and the reference view, and a reconstructed value corresponding to the encoding view from the encoding end is obtained.

It should be noted that, it is no longer necessary to transmit the information about relative locations between the views in this case of making further disparity vector estimation, because the disparity vector between the determined encoding view and the reference view is directly transmitted to the decoding end, as a result, there is no need to compute the disparity vector using the location information anymore.

Since there is a specific computational relationship between the disparity vector between views in the multi-views and the information about relative locations between the views, in the multi-view encoding procedure according to the embodiments of the present invention, it is possible to compute the disparity vector between the views by using the known depth information of the spatial object as well as the location relationship between the cameras. Alternatively, the estimation of the disparity vector between the views can be computed by using the known depth information of the spatial object as well as the location relationship between the cameras, and the location to which the obtained estimation points is used as a start point, to perform further disparity estimation.

In the following, the implementation described in the above section will be illustrated with an example.

(1) At the encoding end, as shown in FIG. 1, the depth D for the object during the multi-view image encoding is first determined, and the disparity vector between the coding view and the reference view is computed and acquired according to the know information about relative locations between the views, for example, a disparity vector being $$d1 = c1 * \frac{D}{D+F}$$

in FIG. 1. Next, the location of a reference view to which the acquired disparity vector points is taken as a start center location and the disparity vector estimation is performed within a specific range. A more accurate disparity vector is acquired as the disparity vector between the determined coding view and the reference view; the coding view is encoded according to the disparity vector, and the encoded result and the disparity vector between the determined coding view and the reference view are written to the bitstream.

(2) At the decoding end, the bitstream is received and parsed to obtain the disparity vector between the determined coding view and the reference view. The bitstream is decoded by using the disparity vector between the determined coding view and the reference view, and a reconstructed value corresponding to the coding view from the encoding end is obtained.

In the above example of application, if there is no further disparity vector estimation, the known depth of the object and the camera location information need to be transmitted to the decoding end. After receiving the depth information and the camera location information, the decoding end then computes the disparity vector and performs further decoding according to the disparity vector. Alternatively, the disparity vector used during encoding can be encoded and written to the bitstream directly, at the encoding end. Thereafter, the corresponding disparity vector can be parsed directly and acquired, and then be used for decoding, at the decoding end.

Based on the above method for acquiring the disparity vector, an embodiment of the present invention further provides a multi-view encoding/decoding method base on a disparity vector.

At the encoding end, the disparity vector between two first views in the process of multi-view image encoding is first determined, and the disparity vector between the two second views is computed according to the disparity vector between the two first views and the known information about relative locations between the views. Next, the coding view is encoded according to the disparity vector between the two second views, and the encoded result and the disparity vector between the determined two views as well as the information about relative locations between the views are written to the bitstream.

At the decoding end, the bitstream is received and parsed to obtain the disparity vector between the determined two views and the information about relative locations between the views. The disparity vector between the other two views corresponding to that of the encoding end is then computed and determined according to the determined disparity vector and the information about relative locations between the views. The bitstream is then decoded by using the disparity vector between the other two views and a reconstructed value corresponding to the coding view from the encoding end is obtained.

The above describes the implementation principle of the embodiments of the present invention. A detailed implementation for the method according to the embodiment of the present invention will be illustrated with reference to the drawings.

Still with reference to FIG. 1, in which A, B, C are the locations of any three cameras in the multi-view; c1, c2 and c3 are the distances between each two among the three cameras; O is a same spatial object which is shot by the three cameras; X axis is an imaging plane; d1, d2 and d3 represent the disparity vectors between each two of views A, B, and C of the object O.

Figure 5:
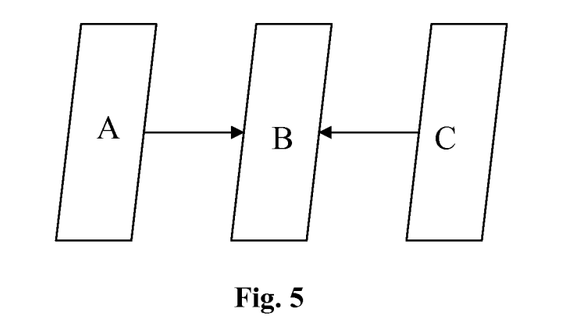
FIG. 5 is a third relationship diagram between a coding view and a reference view.

In this specific embodiment of the present invention, as shown in FIG. 5, view B is a view to be encoded currently, which is referred to as the coding view. View A and view C are the reference views for view B. The image encoding of the view B is done block by block, with a block size of M×N (M=16, 8, 4, N=16, 8, 4). There are totally R blocks in the view B image, which are encoded in order of from left to right and from top to bottom.

The implementation of multi-view encoding by using the method of acquiring the disparity vector according to the embodiment of the present invention comprises the following processing steps:

Step 31: A first disparity estimation is performed between the coding view and a first reference view (i.e., view A or view C), to obtain a first disparity vector (i.e., d1 or d2) between the two views;

Step 32: A second disparity vector (i.e., d2 or d1) between the coding view and a second reference view (i.e., View C or View A) is computed, according to the first disparity vector obtained at step 31 and the known location relationship between the cameras;

Step 33: A prediction value for the coding view is obtained by weighting and summing up a corresponding pixel in the first reference view to which the first disparity vector obtained at step 31 points and a pixel in the second reference view to which the second disparity vector obtained at step 32 points; and Step 34: The prediction value for the encoding view obtained at step 33 is subtracted from the original value for the coding view to obtain a residual value for the coding view; the residual value is transformed, encoded and written to the bitstream; the location information for cameras and the first disparity vector are also encoded and written to the bitstream.

The corresponding decoding procedure based on the above encoding procedure includes:

Step 35: The encoded bitstream is first parsed to obtain the residual value for the coding view;

Step 36: The encoded bitstream is parsed to obtain the location information for cameras and the first disparity vector between the coding view and the first reference view;

Step 37: The second disparity vector between the coding view and the second reference view is computed by using the first disparity vector obtained at step 36 and the location relationship between the cameras;

Step 38: A prediction value for the coding view is obtained by weighting a corresponding pixel in the first reference view to which the first disparity vector obtained at step 36 points and a corresponding pixel in the second reference view to which the second disparity vector obtained at step 37 points, and summing up the two corresponding pixels; and Step 39: A reconstructed value for the coding view is obtained by adding the residual value for the coding view to the prediction value for the coding view obtained at step 38.

For better understanding of the embodiment of the present invention, another detailed implementation of the method according to the embodiment of the present invention will be described with reference to the drawings.

Still with reference to FIG. 1, A, B, C indicate the locations of any three cameras in the multi-view; c1, c2 and c3 are the distances between each two of the three cameras; O is a single spatial object which is shot by the three cameras; X axis is an imaging plane; d1, d2 and d3 represent the disparity vectors between each two of the views A, B, and C of the object O, respectively.

Figure 6:
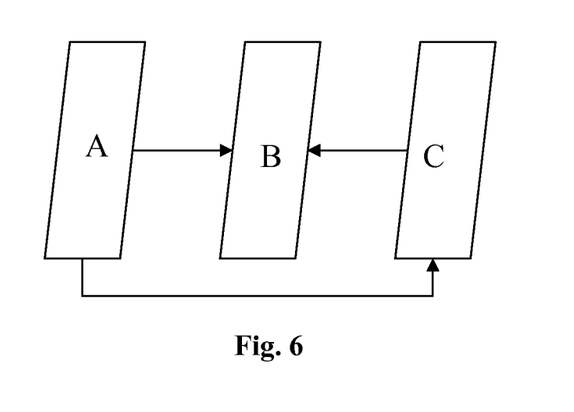
FIG. 6 is a fourth relationship diagram between a coding view and a reference view.

In the embodiment, as shown in FIG. 6, view B is a view to be encoded currently, which is referred to as the coding view. View A and view C are the reference views for view B. View C has been encoded by taking view A as the reference view, and the disparity vector d3 between view A and view C has been obtained. The image encoding of view B is done block by block, with a block size of M×N (M=16, 8, 4, N=16, 8, 4). There are totally R blocks in the image of view B, which are encoded in order of from left to right and from top to bottom.

A direct mode of multi-view encoding using the method of acquiring the disparity vector according to the embodiment of the present invention includes the following processing steps:

Step 51: The disparity vector d1 between the coding view and the reference view A is computed by using the known disparity vector between the references views A and C and the location relationship between the cameras;

Step 52: The disparity vector d2 between the coding view and the reference view C is computed by using the known disparity vector between the two references views and the location relationship between the cameras;

Step 53: A prediction value for the coding view is obtained by weighting a corresponding pixel in reference view A to which the disparity vector d1 obtained at step 51 points and a corresponding pixel in reference view C to which the disparity vector d2 obtained at step 52 points, and summing up the two corresponding pixels; and Step 54: The prediction value for the coding view obtained at step 53 is subtracted from the original value for the coding view to obtain a residual value for the coding view; the residual value is transformed, encoded and written to the bitstream; the location information for cameras and the disparity vector d3 between the two reference views are also encoded and written to the bitstream.

The decoding procedure corresponding to the above encoding procedure includes:

Step 55: The encoded bitstream is first parsed to obtain the residual value for the coding view;

Step 56: The encoded bitstream is parsed to obtain the location information for cameras and the disparity vector between the two reference views;

Step 57: The disparity vector d1 between the coding view and reference view A is computed by using the disparity vector between the two reference views obtained at step 56 and the location relationship between the cameras;

Step 58: The disparity vector d2 between the coding view and reference view C is computed by using the disparity vector between the two reference views obtained at step 56 and the location relationship between the cameras;

Step 59: A prediction value for the coding view is obtained by weighting a corresponding pixel in reference view A to which the disparity vector d1 obtained at step 57 points and a corresponding pixel in reference view C to which the disparity vector d2 obtained at step 58 points, and summing up the two corresponding pixels; and Step 510: A reconstructed value for the coding view is obtained by adding the residual value for the coding view to the prediction value for the coding view obtained at step 59.

Figure 7:
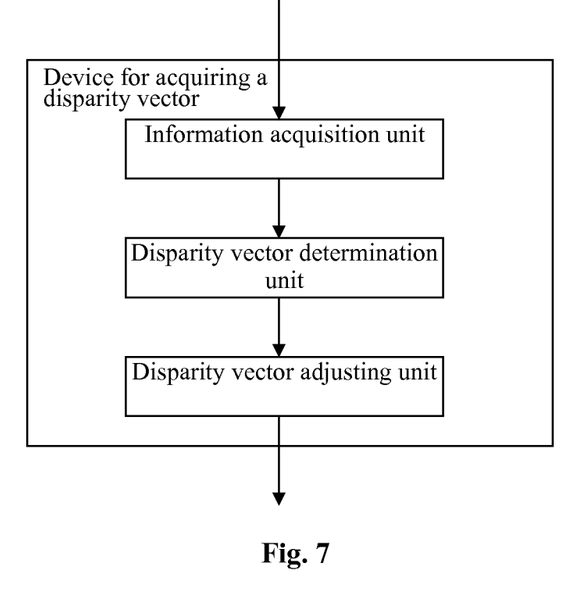
FIG. 7 is a schematic diagram of a device for acquiring a disparity vector, according to an embodiment of the present invention.

An embodiment of the present invention further provides a device for acquiring a disparity vector in the process of multi-view encoding. The detailed structure of the device is shown in FIG. 7, which includes the following processing units:

an information acquisition unit, configured to determine a first disparity vector between any two of the views in the process of the multi-view image encoding, or determine a depth information of the spatial object; and a disparity vector determination unit, configured to compute a second disparity vector between two views needed for the encoding, according to the first disparity vector or the depth information of the spatial object obtained by the information acquisition unit, and the information about relative locations between the views.

Moreover, the embodiment for the device may also include a disparity vector adjusting unit, which is configured to take a location of the reference view to which the second disparity vector obtained by the disparity vector determination unit points, as a start location, and perform a disparity estimation in a predetermined way on the reference view within a preset range, so that a value of the adjusted disparity vector between the coding view and the reference view is obtained and taken as the determined disparity vector value.

Base on the above, the embodiments of the present invention can make efficiently use of the information about relative locations between the cameras for capturing images to compute the disparity vector needed for the multi-view encoding, thereby improving the performance of the multi-view encoding and simplifying the processing of the multi-view encoding.

The above is only preferred embodiments of the present invention, and is not intended to limit the scope of the present invention. Any modification, equivalent substitution and improvement without departing from the spirit and scope of the disclosure are intended to be included in the scope of the disclosure.

What is claimed is:

1. A multi-view encoding method, comprising:
    encoding views according to disparity vectors between the views;
    acquiring location parameter information for cameras corresponding to the views, which represent locations of the cameras;
    encoding the location parameter information; and
    writing the encoded location parameter information to a bitstream;
    wherein the location parameter information for the camera is an absolute coordinate information for the camera, or a relative coordinate information for the cameras corresponding to neighboring views determined by taking location of an arbitrary camera as a coordinate origin, and optionally a motion information of the camera;
    wherein the encoding the views according to the disparity vectors between the views comprises at least one of the following:
        determining a first disparity vector between any two views in the process of encoding multi-view image; computing a second disparity vector between two views needed for the encoding, according to the first disparity vector and relative location information between the views; encoding coding views according to the second disparity vector, and outputting the encoded result; and
        determining depth information of a spatial object and information about relative locations between the views; computing a disparity vector between two views needed for the encoding, by using the depth information of the spatial object and the information about relative locations between the views; and
    wherein, if the first disparity vector is a disparity vector between a coding view and one reference view, and the second disparity vector is a disparity vector between the coding view and another reference view, encoding the coding view according to the second disparity vector and outputting the encoded result comprises:
        weighting and summing up a corresponding pixel in the reference view to which the first disparity vector points and a corresponding pixel in the reference view to which the second disparity vector points, to obtain a prediction value for the coding view; and
        subtracting the prediction value for the coding view from an original value for the coding view to obtain a residual value for the coding view, and encoding the residual value to obtain the encoded result for the coding view.

2. The method of claim 1, further comprising writing flag information to the bitstream, wherein the flag information indicates whether the location parameter information for the cameras corresponding to the views including a reference view and a coding view is written to the bitstream.

3. The method of claim 1, wherein the writing the encoded location parameter information to a bitstream comprises at least one of the following:
    writing the location parameter information for the camera corresponding to a current view respectively into the bitstream before a bitstream location corresponding to a view image bitstream for each view; and
    writing the location parameter information for each of the cameras corresponding to the views collectively into the bitstream before a bitstream location of the view image bitstream of all views.

4. A multi-view decoding method, comprising:
    obtaining location parameter information for cameras in a received bitstream;
    determining disparity vectors between views according to the location parameter information; and
    decoding the views by using the disparity vectors;
    wherein the location parameter information for the camera is an absolute coordinate information for the camera, or a relative coordinate information for the cameras corresponding to neighboring views determined by taking location of an arbitrary camera as a coordinate origin, and optionally a motion information of the camera
    wherein the obtaining the location parameter information in the bitstream comprises:
        parsing the received bitstream to obtain a first disparity vector between any two determined views and information about relative locations between the views;

according to the first disparity vector and the information about relative locations between the views, computing a second disparity vector between two views in which the information about relative locations between the views are determined as the location parameter information for cameras; or, taking the second disparity vector directly obtained from the received bitstream at the decoder end as the location parameter information for cameras; and wherein if the first disparity vector is a disparity vector between a coding view and one reference view, and the second disparity vector is a disparity vector between the coding view and another reference view, the bitstream is decoded by use of the second disparity vector to obtain a reconstructed value corresponding to the decoding view at the decoder end; and the decoding comprises:

weighting and summing up a corresponding pixel in the reference view to which the first disparity vector points and a corresponding pixel in the reference view to which the second disparity vector points, to obtain a prediction value for the coding view; and adding the residual value for the coding view obtained by decoding to the prediction value for the coding view, to obtain the reconstructed value for the coding view.

5. The method of claim 4, further comprising:

performing the step of obtaining the location parameter information in the bitstream, after, at a decoder end, obtaining a flag information for indicating whether an information exists in bitstream about relative locations between the views, including a reference view and a coding view.

6. A multi-view encoding method, comprising:

encoding views according to disparity vectors between the views;

acquiring location parameter information for cameras corresponding to the views, which represent locations of the cameras;

encoding the location parameter information; and writing the encoded location parameter information to a bitstream;

wherein the location parameter information for the camera is an absolute coordinate information for the camera, or a relative coordinate information for the cameras corresponding to neighboring views determined by taking location of an arbitrary camera as a coordinate origin, and optionally a motion information of the camera;

wherein the encoding the views according to the disparity vectors between the views comprises at least one of the following:

determining a first disparity vector between any two views in the process of encoding multi-view image; computing a second disparity vector between two views needed for the encoding, according to the first disparity vector and relative location information between the views; encoding coding views according to the second disparity vector, and outputting the encoded result; and determining depth information of a spatial object and information about relative locations between the views; computing a disparity vector between two views needed for the encoding, by using the depth information of the spatial object and the information about relative locations between the views; and wherein if the first disparity vector is a disparity vector between two reference views and the second disparity vector comprises a fourth disparity vector and a fifth disparity vector, where the fourth disparity vector is a disparity vector between a coding view and one reference view and the fifth disparity vector is a disparity vector between the coding view and another reference view, encoding the coding view according to the second disparity vector and outputting the encoded result comprises:

weighting and summing up a corresponding pixel in the reference view to which the fourth disparity vector points and a corresponding pixel in the reference view to which the fifth disparity vector points, to obtain a prediction value for the coding view;

subtracting the prediction value for the coding view from an original value for the coding view to obtain a residual value for the coding view; and encoding the residual value to obtain the encoded result for the coding view.

7. A multi-view decoding method, comprising:

obtaining location parameter information for cameras in a received bitstream;

determining disparity vectors between views according to the location parameter information; and decoding the views by using the disparity vectors;

wherein the location parameter information for the camera is an absolute coordinate information for the camera, or a relative coordinate information for the cameras corresponding to neighboring views determined by taking location of an arbitrary camera as a coordinate origin, and optionally a motion information of the camera;

wherein the obtaining the location parameter information in the bitstream comprises:

parsing the received bitstream to obtain a first disparity vector between any two determined views and information about relative locations between the views; according to the first disparity vector and the information about relative locations between the views, computing a second disparity vector between two views in which the information about relative locations between the views are determined as the location parameter information for cameras; or, taking the second disparity vector directly obtained from the received bitstream at the decoder end as the location parameter information for cameras; and wherein if the second disparity vector comprises a fourth disparity vector and a fifth disparity vector, where the fourth disparity vector is a disparity vector between a coding view and one reference view and the fifth disparity vector is a disparity vector between the coding view and another reference view, the bitstream is decoded by use of the second disparity vector to obtain a reconstructed value corresponding to the coding view from an encoder end, and the decoding process comprises:

weighting and summing up a corresponding pixel in the reference view to which the fourth disparity vector points and a corresponding pixel in the reference view to which the fifth disparity vector points, to obtain a prediction value for the coding view; and adding the residual value for the coding view obtained by decoding to the prediction value for the coding view to obtain the reconstructed value for the coding view.

8. The method of claim 7, wherein the obtaining the location parameter information in the bitstream further comprises at least one of the following:

decoding the received bitstream to obtain depth information of a spatial object and information about relative locations between the views; and determining the disparity vector according to the depth information of the spatial object and the information about relative locations between the views; or decoding the received bitstream, to obtain the disparity vector according to the location parameter information for cameras.

* * * * *